United States Patent
Mlinar

(10) Patent No.: US 6,733,912 B2
(45) Date of Patent: May 11, 2004

(54) FIXTURE PALLET APPARATUS FOR AUTOMATED ASSEMBLY OF FUEL CELL MATERIAL LAYERS

(75) Inventor: John Russell Mlinar, Coon Rapids, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 244 days.

(21) Appl. No.: 10/115,733

(22) Filed: Apr. 3, 2002

(65) Prior Publication Data

US 2003/0188409 A1 Oct. 9, 2003

(51) Int. Cl.[7] .............................. H01M 8/10; B23P 21/00
(52) U.S. Cl. ............................... 429/32; 429/38; 429/39; 29/706; 29/729; 29/759; 29/777; 29/787
(58) Field of Search .............................. 429/32, 38, 39; 29/706, 729, 759, 777, 787

(56) References Cited

U.S. PATENT DOCUMENTS

| | | | |
|---|---|---|---|
| 2,710,234 A | 6/1955 | Hansen | |
| 3,178,041 A | 4/1965 | Wheat et al. | |
| 3,285,112 A | 11/1966 | Dale et al. | |

(List continued on next page.)

FOREIGN PATENT DOCUMENTS

| | | |
|---|---|---|
| BE | 1007774 A3 | 10/1995 |
| DE | 26 10 628 A | 9/1977 |
| EP | 0 654 347 A1 | 11/1994 |
| FR | 2 456 613 A | 12/1980 |
| GB | 1 084 597 A | 9/1967 |
| GB | 2101098 A | 1/1983 |
| JP | 55-98040 | 7/1980 |
| JP | 57-93854 | 6/1982 |
| JP | 62-244830 | 10/1987 |
| JP | 403-128851 | 5/1991 |
| JP | 403-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |

OTHER PUBLICATIONS

U.S. patent application Ser. No. 10/446,485, filed May 28, 2003, Roll–Good Fuel Cell Fabrication Processes, Equipment, and Articles Produced From Same.
U.S. patent application Ser. No. 10/115,516, Mliner et al., filed Apr. 3, 2002, co–pending application.
U.S. patent application Ser. No. 10/115,556, Eaton et al., filed Apr. 3, 2002, co–pending application.
U.S. patent application Ser. No. 10/115,537, Schukar et al., filed Apr. 3, 2002, co–pending application.

(List continued on next page.)

*Primary Examiner*—Hoa Van Le
(74) *Attorney, Agent, or Firm*—Mark A. Hollingsworth; Philip Y. Dahl

(57) ABSTRACT

A first fixture of a transportable fixture apparatus incorporates a substantially porous first region adapted to receive one or more porous and/or non-porous first material layers, such as fuel cell layers, and to facilitate formation of a vacuum between the first fixture and the first material layers. A second fixture incorporates a substantially porous second region adapted to receive one or more porous and/or non-porous second material layers and to facilitate formation of a vacuum between the second fixture and the second material layers. A stop arrangement protrudes from one or both of the first and second fixtures, and is situated peripheral to the first and second material layers when the first and second fixtures are brought into contact. The stop arrangement defines a cavity adapted to effect compression of the first and second material layers when the first and second fixtures are brought into contact.

38 Claims, 2 Drawing Sheets

U.S. PATENT DOCUMENTS

| | | |
|---|---|---|
| 3,359,046 A | 12/1967 | Dryden |
| 3,380,788 A | 4/1968 | Wilcock |
| 3,477,558 A | 11/1969 | Fleischauer |
| 3,861,259 A | 1/1975 | Hitch |
| 3,946,920 A | 3/1976 | Jordan et al. |
| 4,143,871 A | 3/1979 | Blessing |
| 4,168,772 A | 9/1979 | Eberle |
| 4,236,814 A | 12/1980 | Tonkin |
| 4,286,467 A | 9/1981 | Kober |
| 4,360,260 A | 11/1982 | Eloranta et al. |
| 4,381,596 A | 5/1983 | Simonton et al. |
| 4,534,549 A | 8/1985 | Eberle |
| 4,591,139 A | 5/1986 | Engelbart |
| 4,676,862 A | 6/1987 | Kuchnert |
| 4,728,093 A | 3/1988 | Eberle |
| 4,784,380 A | 11/1988 | Eberle |
| 4,819,928 A | 4/1989 | Osborn et al. |
| 4,887,858 A | 12/1989 | Gazzarrini |
| 5,031,002 A | 7/1991 | Yaguchi |
| 5,048,182 A | 9/1991 | Robbins, III |
| 5,061,337 A | 10/1991 | Fraser |
| 5,063,415 A | 11/1991 | Ariyama |
| 5,078,375 A | 1/1992 | Steidinger |
| 5,133,543 A | 7/1992 | Eitel et al. |
| 5,456,871 A | 10/1995 | Harada et al. |
| 5,556,499 A | 9/1996 | Clough |
| 5,596,897 A | 1/1997 | Payne, Jr. et al. |
| 5,762,753 A | 6/1998 | Clough |
| 5,783,024 A | 7/1998 | Forkert |
| 5,791,185 A | 8/1998 | Bodnar |
| 5,910,378 A * | 6/1999 | Debe et al. .................. 429/42 |
| 5,989,747 A | 11/1999 | Tanaka et al. |
| 6,007,660 A | 12/1999 | Forkert |
| 6,059,003 A | 5/2000 | Wittkopf |
| 6,066,409 A | 5/2000 | Ronne et al. |
| 6,159,327 A | 12/2000 | Forkert |
| 6,224,203 B1 | 5/2001 | Wotton et al. |
| 6,241,839 B1 | 6/2001 | Yoshino et al. |
| 6,347,585 B1 | 2/2002 | Kiamco et al. |
| 6,405,779 B1 | 6/2002 | Wittkopf |
| 6,419,217 B1 | 7/2002 | Hartmann et al. |
| 2002/0014509 A1 | 2/2002 | Kitai et al. |

OTHER PUBLICATIONS

U.S. patent application Ser. No. 10/115,513, Behymer, filed Apr. 3, 2002, co–pending application.

U.S. patent application Ser. No. 10/115,778, Hirsch, filed Apr. 3, 2002, co–pending application.

U.S. patent application Ser. No. 10/115,777, Ripley, filed Apr. 3, 2002, co–pending application.

U.S. patent application Ser. No. 10/116,323, Ripley, filed Apr. 3, 2002, co–pending application.

U.S. patent application Ser. No. 10/115,523, Ripley et al., filed Apr. 3, 2002, co–pending application.

U.S. patent application Ser. No. 10/115,731, Mlinar, filed Apr. 3, 2002, co–pending application.

* cited by examiner

FIXTURE PALLET APPARATUS FOR AUTOMATED ASSEMBLY OF FUEL CELL MATERIAL LAYERS

FIELD OF THE INVENTION

The present invention relates generally to fixture pallets and, more particularly, to fixture apparatuses for facilitating automated assembly, handling, and/or bonding of porous and non-porous layers of a fuel cell during fuel cell assembly.

BACKGROUND OF THE INVENTION

A variety of apparatuses have been developed for stacking layers of various materials. Apparatuses have also been developed for laminating stacks of such material layers. Conventional stacking apparatuses, for example, typically employ suction cups or a vacuum to releasably engage and transport layers of a given material during a stacking operation. Although such conventional arrangements may be satisfactory in certain applications, implementing known approaches for stacking relatively thin materials having varying porosity renders conventional arrangements unworkable or impractical.

It is often desirable to automate, either partially or completely, a number of stacking and bonding operations. Many conventional material stacking, transporting, and bonding apparatuses are not well suited for achieving a high level of automation. This is particularly the case for stacking and bonding processes which have tight positional tolerance requirements at all stages of processing.

There is a need for improved material layer stacking and bonding apparatuses. There is a further need for such apparatuses that can safely and precisely position and stack material layers of varying porosity and laminate such material layers in an automated assembly environment, such as in an automated fuel cell assembly line. The present invention fulfills these and other needs.

SUMMARY OF THE INVENTION

The present invention is directed to a transportable fixture apparatus for facilitating automatic assembly and handling of a stack of material layers. The present invention is also directed to a transportable fixture apparatus that allows for lamination of a stack of material layers in-situ the transportable fixture apparatus.

According to one embodiment of the present invention, a first fixture of the transportable fixture apparatus incorporates a substantially porous first region adapted to receive one or more porous and/or non-porous first material layers and to facilitate formation of a vacuum between the first fixture and the first material layers. The transportable fixture assembly also includes a second fixture that incorporates a substantially porous second region adapted to receive one or more porous and/or non-porous second material layers and to facilitate formation of a vacuum between the second fixture and the second material layers. The transportable fixture assembly further incorporates a stop arrangement that protrudes from one or both of the first fixture and the second fixture. The stop arrangement is situated peripheral to the first and second material layers when the first fixture is in contact with the second fixture. The stop arrangement defines a cavity adapted to effect compression of the first and second material layers when the first fixture is brought into contact with the second fixture under pressure.

In accordance with another embodiment, a transportable fixture apparatus of the present invention facilitates automatic assembly of fuel cell layers. The fuel cell layers include at least a first fluid transport layer (first FTL), a second fluid transport layer (second FTL), and a membrane. The first FTL and the membrane define a FTL/membrane sub-assembly.

The transportable fixture includes a first fixture that incorporates a substantially porous first region adapted to receive the FTL/membrane sub-assembly and to facilitate formation of a vacuum between the first fixture and the FTL/membrane sub-assembly. A second fixture incorporates a substantially porous second region adapted to receive the second FTL and to facilitate formation of a vacuum between the second fixture and the second FTL. A stop arrangement protrudes from one or both of the first fixture and the second fixture, and is situated peripheral to the FTL/membrane sub-assembly and second FTL when the first fixture is in contact with the second fixture. The stop arrangement defines a cavity adapted to effect compression of the FTL/membrane sub-assembly and second FTL when the first fixture is brought into contact with the second fixture under pressure.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
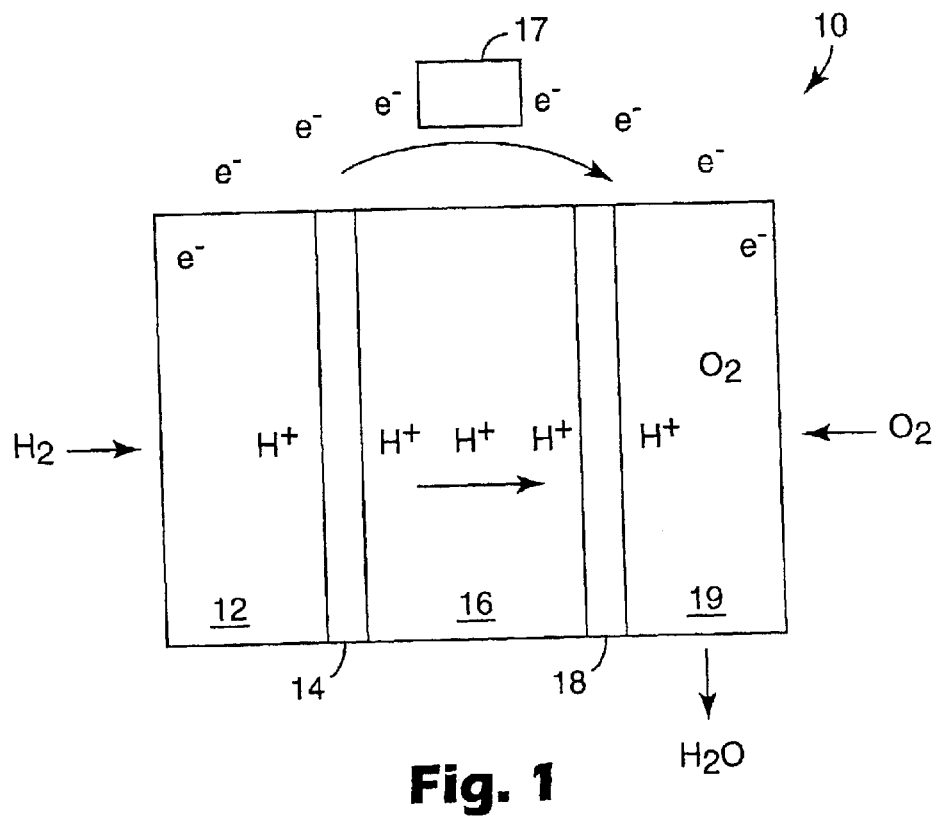
FIG. 1 is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

A fixture pallet assembly of the present invention facilitates safe and precise assembly and handling of relatively thin porous and non-porous material layers during a stack assembly operation. In addition to facilitating handling and assembly of materials having varying porosity, materials having varying brittleness can be safely handled and stacked with use of a fixture pallet assembly of the present invention. A high degree of accuracy can be achieved during a stacking operation by use of a fixture pallet assembly of the present invention in applications which have tight locational tolerance requirements for building stacks of thin material layers.

A fixture pallet assembly of the present invention also facilitates transport of a stack of relatively thin porous and non-porous material layers between various processing stations while concurrently maintaining positional alignment of the material layers during stack transport. A fixture pallet assembly of the present invention further facilitates bonding or lamination of a stack of relatively thin porous and non-porous material layers while concurrently maintaining positional alignment of the material layers during a bonding process.

A compression cavity can advantageously be formed within the fixture pallet assembly to provide a predefined amount of stack compression during a bonding process. The compression cavity can be implemented to precisely control the thickness of a stack of relatively thin porous and non-porous material layers during a bonding process. A fixture pallet assembly of the present invention is particularly well suited for facilitating automated assembly and bonding of a stack of relatively thin porous and non-porous material layers.

In accordance with one application, a fixture pallet assembly of the present invention can be employed to facilitate automated stacking and, if desired, bonding of material layers defining a fuel cell or a portion of a fuel cell. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell is depicted in FIG. 1. The fuel cell 10 shown in FIG. 1 includes a first fluid transport layer 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A fixture pallet assembly of the present invention can be employed to facilitate automated handling, stacking, and bonding of material layers in the construction of fuel cells of varying technologies. For example, a fixture pallet assembly of the present invention can be employed to construct proton exchange membrane (PEM) fuel cells. PEM fuel cells operate at relatively low temperatures (about 175 degrees F), have high power density, can vary their output quickly to meet shifts in power demand, and are well suited for applications where quick startup is required, such as in automobiles for example.

The proton exchange membrane used in a PEM fuel cell is a thin plastic sheet that allows hydrogen ions to pass through it. The membrane is coated on both sides with highly dispersed metal or metal alloy particles (e.g., platinum or platinum/ruthenium) that are active catalysts. The electrolyte used is typically a solid organic polymer polyperfluorosulfonic acid. Use of a solid electrolyte is advantageous because it reduces corrosion and management problems.

Hydrogen is fed to the anode side of the fuel cell where the catalyst encourages the hydrogen ions to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

According to one PEM fuel cell construction, a PEM layer is sandwiched between a pair of fluid transport layers, such as diffuse current collectors or gas diffusion layers for example. An anode is situated between a first FTL and the membrane, and a cathode is situated between the membrane and a second FTL. In one configuration, a PEM layer is fabricated to include an anode catalyst coating on one surface and a cathode catalyst coating on the other surface. According to another configuration, the first and second FTLs are fabricated to include an anode and cathode catalyst coating, respectively. In yet another configuration, an anode catalyst coating can be disposed partially on the first FTL and partially on one surface of the PEM, and a cathode catalyst coating can be disposed partially on the second FTL and partially on the other surface of the PEM. The five layer construct defined by the first FTL/anode/PEM/cathode/second FTL is referred to as a membrane electrode assembly (MEA).

The FTLs are typically fabricated from a carbon fiber paper or non-woven material. Depending on the product construction, the FTLs can have carbon particle coatings on one side. The FTLs, as discussed above, can be fabricated to include or exclude a catalyst coating. The FTLs, according to this product construction, are both porous and brittle. A material layer handling, stacking, and bonding fixture consistent with the principles of the present invention is particularly well suited for safely and accurately positioning and transporting thin, brittle fuel cell layers, such as FTLs for example, during automated fuel cell assembly.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190 degrees F.

Molten carbonate fuel cells (MCFC) use a liquid solution of lithium, sodium and/or potassium carbonates, soaked in a matrix for an electrolyte. MCFCs operate at about 1,200 degrees F. The high operating temperature is needed to achieve sufficient conductivity of the electrolyte. Because of this high temperature, noble metal catalysts are not required for the cell's electrochemical oxidation and reduction processes. MCFCs are typically operated on hydrogen, carbon monoxide, natural gas, propane, landfill gas, marine diesel, and simulated coal gasification products.

A solid oxide fuel cell (SOFC) typically employs a hard ceramic material of solid zirconium oxide and a small amount of ytrria, instead of a liquid electrolyte, allowing operating temperatures to reach 1,800 degrees F.

In regenerative fuel cells, water is separated into hydrogen and oxygen by a solar-powered electrolyser. The hydrogen and oxygen are fed into the regenerative fuel cell which generates electricity, heat, and water. The water is then recirculated back to the solar-powered electrolyser and the process is repeated.

A protonic ceramic fuel cell (PCFC) employs a ceramic electrolyte material that exhibits high protonic conductivity at elevated temperatures. PCFCs operate at about 1,300 degrees F. PCFCs can operate at high temperatures and electrochemically oxidize fossil fuels directly to the anode. Gaseous molecules of the hydrocarbon fuel are absorbed on the surface of the anode in the presence of water vapor, and hydrogen ions are efficiently stripped off to be absorbed into the electrolyte, with carbon dioxide as the primary reaction product. These and other fuel cell technologies can be constructed and stacked by use of a handling and stacking apparatus and methodology in accordance with the present invention.

It is often necessary or desirable to carefully handle and transport various types of porous and non-porous material layers when constructing stacks of such material layers. Once constructed, it is desirable to transport the stack of porous and non-porous material layers from one processing station to another in an automated fashion. In the construction of a PEM fuel cell, for example, a non-porous PEM layer is sandwiched between a pair of porous FTLs. Although it would appear that conventional vacuum techniques could be employed to automate construction and transport of the FTL/PEM/FTL stack, those skilled in the art will readily appreciate that the non-porous nature of the sandwiched PEM layer renders such conventional techniques unworkable or impractical.

By way of example, assuming that a FTL/PEM/FTL stack has been constructed, it is typically necessary to move this stack from the stacking station to one or more other process stations (e.g., bonding station) without disturbing the alignment of the FTL and PEM layers within the stack. It can be appreciated that disrupting the positioning of the FTL and PEM layers within the stack can result in significant downstream processing inaccuracies and unacceptable fuel cell rejection rates. Applying vacuum via the first FTL or the second FTL of the FTL/PEM/FTL structure is effective for stabilizing only the first FTL/PEM layers or the second FTL/PEM layers, due to the non-porous nature of the PEM layer. As such, the application of vacuum to the FTL/PEM/FTL stack via the first or second FTL layer is ineffectual when attempting to move the entire stack and maintain positional alignment amongst the layers within the stack. A fixture pallet assembly of the present invention can be used to overcome these and other deficiencies associated with conventional approaches, and provides additional benefits when constructing and transporting stacks of porous and non-porous material layers.

Figure 2:
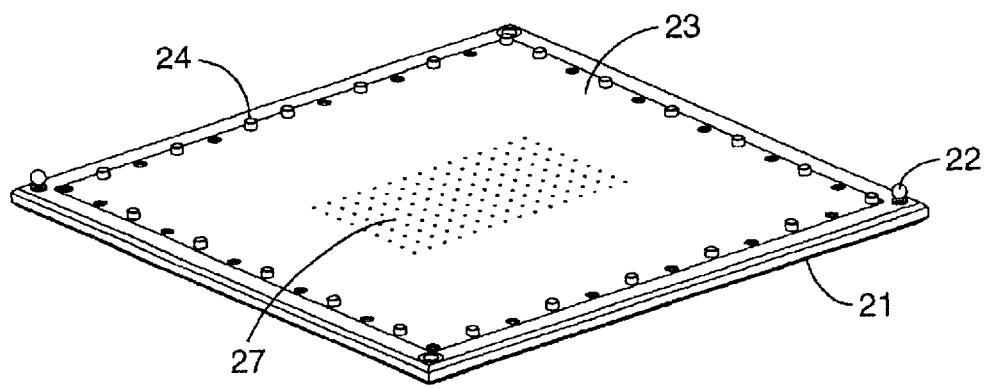
FIG. 2 illustrates one of two fixtures of a two-part fixture pallet assembly well suited for facilitating automated stacking and bonding of fuel cell layers in accordance with an embodiment of the present invention.
Figure 3:
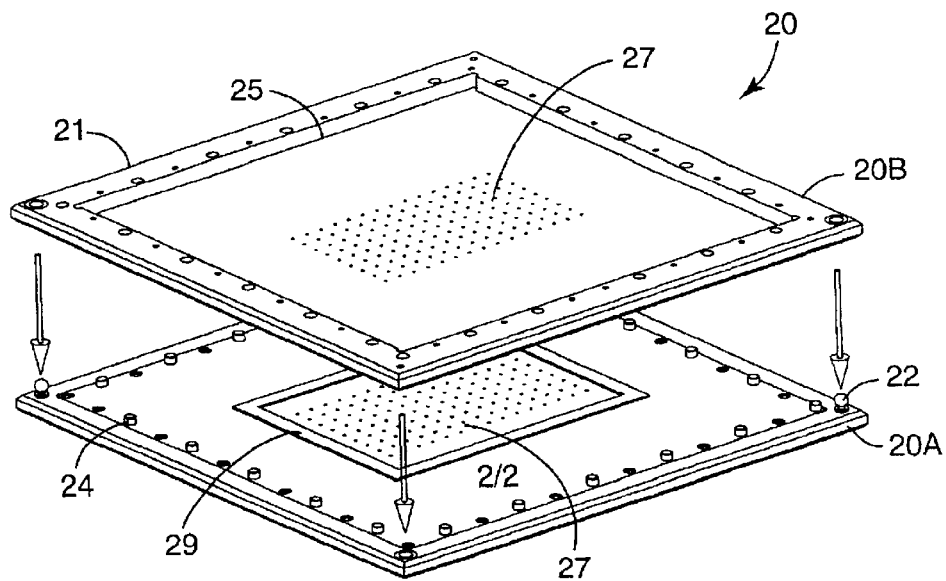
FIG. 3 is an illustration of a two-part fixture pallet assembly in accordance with an embodiment of the present invention.
Figure 4:
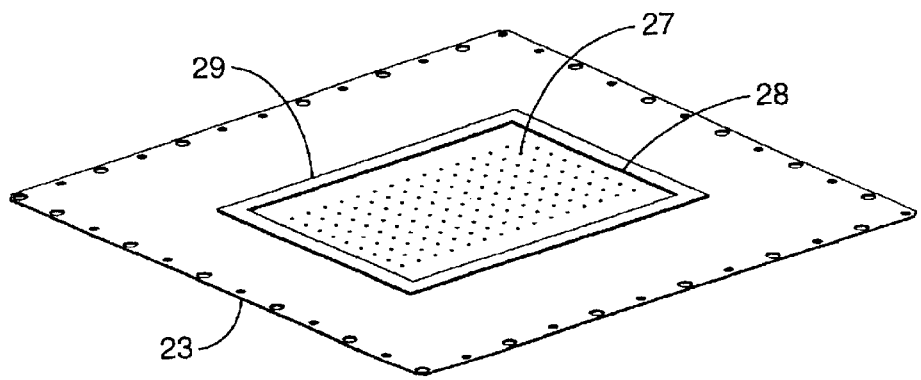
FIG. 4 illustrates a fixture which includes a porous region bounded by a stop arrangement in accordance with an embodiment of the present invention.

With reference to FIGS. 2–4, there is illustrated a transportable fixture pallet assembly 20 in accordance with an embodiment of the present invention. The fixture pallet assembly 20 is preferably used to facilitate automated stacking, transporting, and bonding of porous and non-porous material layers, such as porous and non-porous fuel cell layers. The fixture pallet assembly 20 advantageously provides a structure within which a multiplicity of porous and non-porous material layers can be stacked and positional alignment of the layers can be maintained during construction of the stack.

In addition, the fixture pallet assembly 20 provides a structure for transporting a stack of material layers from one processing station to various other processing stations, such as a bonding station, while maintaining positional alignment of the layers during transport and subsequent processing. For example, once the material layers of a stack are positioned within the fixture pallet assembly 20, the alignment of the stack within the fixture pallet assembly 20 is fixed and known. As such, the fixture pallet assembly 20 need only be properly aligned at a downstream processing station to ensure that the stack contained therein is in proper alignment for processing at the downstream processing station.

According to the embodiment shown in FIGS. 2–4, the fixture pallet assembly 20 is a two-part assembly. The fixture pallet assembly 20 is shown to include a first fixture 20A and a second fixture 20B. The first and second fixtures 20A, 20B each include a frame 21 and a plate 23 situated within a cutout portion 25 of the frame 21. Screws 24 are used to mount the plate 23 to the frame 21. It is understood that other means of fastening the plate 23 to the frame 21 may be employed.

The cutout portion 25 of the frame 21 within which the plate 23 is positioned is preferably configured to allow a bonding press to directly contact the plate 23. According to this configuration, the bonding press directly contacts the plate 23 without contacting the frame 21, which would otherwise result in formation of a gap between the bonding press and plate 23. This direct contact arrangement provides for efficient transfer of heat from the bonding press to the stack of material layers positioned within the fixture pallet assembly 20 during a bonding operation. Direct contact between the bonding press and the plate 23 advantageously reduces the time required for heat transfer between the bonding press and the stack of material layers constrained within the fixture pallet assembly 20.

The plate 23 includes at least one substantially porous region 27. The porous region 27 may define a depression or recess 28 relative to the plane of the plate 23. The porous region 27 is depicted in FIGS. 2–4 as a pattern of apertures provided in the plate 23. The porous region 27 permits air to flow freely through the plate 23 and allows for the production and removal of a vacuum during use of the fixture pallet assembly 20. For example, a vacuum produced on one side of the porous region 27 provides for releasable engagement of a porous material layer, non-porous material layer or combination of porous and non-porous material layers situated proximate the other side of the porous region 27. Further, the porous region 27 is preferably configured to permit both the fixture, such as the first fixture 20A, and a porous and/or non-porous material layer situated proximate the other side of the porous region 27 to be moved as a unit via a vacuum and mechanical gripping mechanism. As is illustrated, a porous region is preferably provided on the plate 23 of each of the first and second fixtures 20A, 20B.

The porous region 27 of the plate 23 is adapted to receive one or more material layers and to facilitate formation of a vacuum between the plate 23 and the material layers(s) residing within porous region 27. As such, the size and shape of the porous region 27 is designed to accommodate the size and shape of the material layers to be stacked, transported, and bonded within the fixture pallet assembly 20.

An advantageous feature of a fixture pallet assembly 20 of the present invention concerns a stop arrangement 29 built into the fixture pallet assembly 20. The stop arrangement 29 can be provided on the first fixture 20A, on the second fixture 20B or on both first and second fixtures 20A, 20B. The stop arrangement 29 protrudes from the plate 21 of one or both of the first and second fixtures 20A, 20B. The stop arrangement 29 is situated peripheral to the porous region 27 and the material layer(s) when the material layer(s) are received within the porous region 27. Although shown proximate the porous region 27, the stop arrangement 29 can be situated on the plate at a desired location between the porous region 27 and the frame 21. The frame 21 may also be formed to incorporate a stop arrangement 29.

The stop arrangement 29 can be unitary with one or both of the first and second fixtures 20A, 20B or, alternatively, be mounted on (integral with) one or both of the first and second fixtures 20A, 20B. In one configuration, the stop arrangement 29 can be implemented as a raised machined portion of the plate 23 of one or both of the first and second fixtures 20A, 20B. The stop arrangement 29 can be implemented as a continuous band or discontinuous band protruding from the plate 23 of one or both of the first and second fixtures 20A, 20B. For example, the stop arrangement 29 may include one or more alignment holes or other voids/breaks to define a discontinuous stop band. Moreover, a number of unconnected protrusions of varying shapes and sizes (e.g., linear, curved, spherical, etc.) may be incorporated on one or both of the first and second fixtures 20A, 20B to define a stop arrangement 29.

The stop arrangement 29 can be implemented to form a compression cavity within the fixture pallet assembly 20 to provide a desired amount of stack compression during a bonding process. The height of the stop arrangement 29 can be selected to precisely control the thickness of the resultant stack of material layers subject to bonding within the fixture pallet assembly 20. As such, the height of the stop arrangement 29 can be judiciously selected to control both the compression the stack experiences during the bonding process and the thickness of the resultant laminated stack.

The height of the stop arrangement 29 can be selected to provide a desired clearance between the porous regions 27 of the compression cavity. Inclusion of the stop arrangement 29 within the fixture pallet assembly 20 allows the clearance within the compression cavity to remain substantially constant when the first fixture 20A is brought into contact with the second fixture 20B under pressure.

In general, compression is achieved by selecting this clearance to be smaller than a combined thickness of the stack of material layers when in an uncompressed state. By way of example, the clearance within the compression cavity can be selected to provide for a combined thickness of a fluid transport layer (FTL)/membrane/FTL stack that achieves a predetermined level of compression of the FTL/membrane/FTL stack when the first fixture 20A is brought into contact with the second fixture 20B under pressure.

The fixture pallet assembly 20 preferably incorporates an alignment arrangement that provides for registration of the first fixture 20A relative to the second fixture 20B when the first and second fixtures 20A, 20B are brought into contact under pressure. The alignment arrangement can include one or more alignment features situated on the first and second fixtures 20A, 20B.

For example, and as shown in FIGS. 2 and 3, the alignment arrangement can include tooling balls 22 provided on the first fixture 20A that register with corresponding circular voids provided in the second fixture 20B. In another configuration, the alignment arrangement can include locating pins that effect the requisite registration of the first fixture 20A relative to the second fixture 20B when the first and second fixtures 20A, 20B are brought into contact under pressure. Other known alignment arrangements can be employed to ensure proper registration of the first fixture 20A relative to the second fixture 20B.

According to another configuration, the fixture pallet assembly 20 can include an alignment arrangement to allow for accurate positioning of the fixture pallet assembly 20 at various processing stations, such as when the fixture pallet assembly 20 is moved from a stacking station to a bonding station, and from the bonding station to a cutting station, for example. As such, the fixture pallet assembly 20 need only be properly aligned at each processing station to ensure that the stack contained within the fixture pallet assembly 20 is in proper alignment for processing at the particular station.

The fixture pallet assembly 20 can be formed from a variety of hard materials. For example, the fixture pallet assembly 20 can be formed from various types of hardened steel. The stop arrangement 20 can be formed of the same material as the plate 23 or a material harder than that of the plate 23.

As was discussed previously, a fixture pallet assembly of the present invention can be employed to facilitate automated stacking, transport, and bonding of various porous and non-porous material layers, such as material layers defining a fuel cell or a portion of a fuel cell. Various automated stacking, transporting, and bonding processes which can employ a fixture pallet assembly of the present invention are described in commonly owned copending application entitled "APPARATUS AND METHOD FOR AUTOMATICALLY STACKING FUEL CELL MATERIAL LAYERS," filed concurrently herewith under, which is hereby incorporated herein by reference.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A transportable fixture apparatus for facilitating automatic assembly of a plurality of fuel cell layers, the plurality of fuel cell layers comprising at least a first fluid transport layer (first FTL), a second fluid transport layer (second FTL), and a membrane, the first FTL and the membrane defining a FTL/membrane sub-assembly, the fixture apparatus comprising:

a first fixture comprising a first frame, a first plate situated within the first frame, and a substantially porous first region provided on the first plate, the porous first region adapted to receive the FTL/membrane sub-assembly and to facilitate formation of a vacuum between the first plate and the FTL/membrane sub-assembly;

a second fixture comprising a second frame, a second plate situated within the second frame, and a substantially porous second region provided on the second plate, the porous second region adapted to receive the second FTL and to facilitate formation of a vacuum between the second plate and the second FTL; and a stop arrangement protruding from one or both of the first plate and the second plate and situated peripheral to the FTL/membrane sub-assembly and second FTL when the first fixture is in contact with the second fixture, the stop arrangement defining a cavity adapted to effect compression of the FTL/membrane sub-assembly and second FTL when the first fixture is brought into contact with the second fixture under pressure.

2. The fixture apparatus of claim 1, wherein the stop arrangement comprises:

a first stop arrangement protruding from the first plate, the first stop arrangement situated peripheral to the porous first region and the FTL/membrane sub-assembly when the FTL/membrane sub-assembly is received by the porous first region; and a second stop arrangement protruding from the second plate, the second stop arrangement situated peripheral to the porous second region and the second FTL when the second FTL is received by the porous second region, the first and second stop arrangements defining the cavity adapted to effect compression of the FTL/membrane sub-assembly and second FTL when the first fixture is brought into contact with the second fixture under pressure.

3. The fixture apparatus of claim 1, wherein the stop arrangement is integral with one or both of the first plate and the second plate.

4. The fixture apparatus of claim 1, wherein the stop arrangement is unitary with one or both of the first plate and the second plate.

5. The fixture apparatus of claim 1, wherein the stop arrangement defines a continuous band protruding from one or both of the first plate and the second plate.

6. The fixture apparatus of claim 1, wherein the stop arrangement defines a discontinuous band protruding from one or both of the first plate and the second plate.

7. The fixture apparatus of claim 1, wherein a clearance dimension defined between the porous first and second regions forming the cavity remains substantially constant when the first fixture is brought into contact with the second fixture under pressure.

8. The fixture apparatus of claim 7, wherein the clearance dimension is smaller than a combined thickness of the FTL/membrane sub-assembly and second FTL.

9. The fixture apparatus of claim 7, wherein the clearance dimension is selected to provide for a combined thickness of the FTL/membrane sub-assembly and second FTL that achieves a predetermined level of compression of the FTL/membrane sub-assembly and second FTL when the first fixture is brought into contact with the second fixture under pressure.

10. The fixture apparatus of claim 1, wherein the first frame and the second frame respectively comprise an alignment arrangement to facilitate registration of the first and second fixtures when brought into contact under pressure.

11. The fixture apparatus of claim 1, wherein the alignment arrangement comprises locating pins or tooling balls.

12. The fixture apparatus of claim 1, wherein the first plate is recessed within the first frame and the second plate is recessed within the second frame.

13. The fixture apparatus of claim 12, wherein:

the first plate comprises a first surface and a second surface, and a first stop arrangement protrudes from the first surface of the first plate;

the second plate comprises a first surface and a second surface, and a second stop arrangement protrudes from the first surface of the second plate;

a recess formed between the first frame and the second surface of the first plate is adapted to receive a first half of a press; and a recess formed between the second frame and the second surface of the second plate is adapted to receive a second half of a press.

14. A transportable fixture apparatus for facilitating automatic assembly of a plurality of fuel cell layers, the plurality of fuel cell layers comprising at least a first fluid transport layer (first FTL), a second fluid transport layer (second FTL), and a membrane, the first FTL and the membrane defining a FTL/membrane sub-assembly, the fixture apparatus comprising:

a first fixture comprising a substantially porous first region adapted to receive the FTL/membrane sub-assembly and to facilitate formation of a vacuum between the first fixture and the FTL/membrane sub-assembly;

a second fixture comprising a substantially porous second region adapted to receive the second FTL and to facilitate formation of a vacuum between the second fixture and the second FTL; and a stop arrangement protruding from one or both of the first fixture and the second fixture and situated peripheral to the FTL/membrane sub-assembly and second FTL when the first fixture is in contact with the second fixture, the stop arrangement defining a cavity adapted to effect compression of the FTL/membrane sub-assembly and second FTL when the first fixture is brought into contact with the second fixture under pressure.

15. The fixture apparatus of claim 14, wherein the stop arrangement comprises:

a first stop arrangement protruding from the first fixture, the first stop arrangement situated peripheral to the porous first region and the FTL/membrane sub-assembly when the FTL/membrane sub-assembly is received by the porous first region; and a second stop arrangement protruding from the second fixture, the second stop arrangement situated peripheral to the porous second region and the second FTL when the second FTL is received by the porous second region, the first and second stop arrangements defining the cavity adapted to effect compression of the FTL/membrane sub-assembly and second FTL when the first fixture is brought into contact with the second fixture under pressure.

16. The fixture apparatus of claim 14, wherein the stop arrangement is integral with one or both of the first fixture and the second fixture.

17. The fixture apparatus of claim 14, wherein the stop arrangement is unitary with one or both of the first fixture and the second fixture.

18. The fixture apparatus of claim 14, wherein the stop arrangement defines a continuous band protruding from one or both of the first fixture and the second fixture.

19. The fixture apparatus of claim 14, wherein the stop arrangement defines a discontinuous band protruding from one or both of the first fixture and the second fixture.

20. The fixture apparatus of claim 14, wherein a clearance dimension defined between the porous first and second regions forming the cavity remains substantially constant when the first fixture is brought into contact with the second fixture under pressure.

21. The fixture apparatus of claim 20, wherein the clearance dimension is smaller than a combined thickness of the FTL/membrane sub-assembly and second FTL.

22. The fixture apparatus of claim 20, wherein the clearance dimension is selected to provide for a combined thickness of the FTL/membrane sub-assembly and second FTL that achieves a predetermined level of compression of the FTL/membrane sub-assembly and second FTL when the first fixture is brought into contact with the second fixture under pressure.

23. The fixture apparatus of claim 14, wherein the first fixture and the second fixture respectively comprise an alignment arrangement to facilitate registration of the first and second fixtures when brought into contact under pressure.

24. The fixture apparatus of claim 23, wherein the alignment arrangement comprises locating pins or tooling balls.

25. The fixture apparatus of claim 14, wherein:
the first fixture comprises a first surface having a first recessed region and a second surface having a second recessed region, the porous first region and a first stop arrangement respectively situated within the first recessed region; and
the second fixture comprises a first surface having a third recessed region and a second surface having a fourth recessed region, the porous second region and a second stop arrangement respectively situated within the third recessed region.

26. The fixture apparatus of claim 25, wherein the second recessed region of the first fixture is adapted to receive a first half of a press, and the fourth recessed region of the second fixture is adapted to receive a second half of a press.

27. A transportable fixture apparatus for facilitating automatic assembly of a plurality of material layers comprising at least one substantially non-porous material layer and at least one substantially porous material layer, a first substantially porous material layer and a substantially non-porous material layer defining a sub-assembly, the fixture apparatus comprising:
a first fixture comprising a substantially porous first region adapted to receive the sub-assembly and to facilitate formation of a vacuum between the first fixture and the sub-assembly;
a second fixture comprising a substantially porous second region adapted to receive a second substantially porous material layer (second layer) and to facilitate formation of a vacuum between the second fixture and the second layer; and
a stop arrangement protruding from one or both of the first fixture and the second fixture and situated peripheral to the sub-assembly and second layer when the first fixture is in contact with the second fixture, the stop arrangement defining a cavity adapted to effect compression of the sub-assembly and second layer when the first fixture is brought into contact with the second fixture under pressure.

28. The fixture apparatus of claim 27, wherein the stop arrangement is integral with one or both of the first fixture and the second fixture.

29. The fixture apparatus of claim 27, wherein the stop arrangement is unitary with one or both of the first fixture and the second fixture.

30. The fixture apparatus of claim 27, wherein the stop arrangement defines a continuous band protruding from one or both of the first fixture and the second fixture.

31. The fixture apparatus of claim 27, wherein the stop arrangement defines a discontinuous band protruding from one or both of the first fixture and the second fixture.

32. The fixture apparatus of claim 27, wherein a clearance dimension defined between the porous first and second regions forming the cavity remains substantially constant when the first fixture is brought into contact with the second fixture under pressure.

33. The fixture apparatus of claim 32, wherein the clearance dimension is smaller than a combined thickness of the sub-assembly and second layer.

34. The fixture apparatus of claim 32, wherein the clearance dimension is selected to provide for a combined thickness of the sub-assembly and second layer that achieves a predetermined level of compression of the sub-assembly and second layer when the first fixture is brought into contact with the second fixture under pressure.

35. The fixture apparatus of claim 27, wherein the first fixture and the second fixture respectively comprise an alignment arrangement to facilitate registration of the first and second fixtures when brought into contact under pressure.

36. The fixture apparatus of claim 35, wherein the alignment arrangement comprises locating pins or tooling balls.

37. The fixture apparatus of claim 27, wherein:
the first fixture comprises a first surface having a first recessed region and a second surface having a second recessed region, the porous first region and a first stop arrangement respectively situated within the first recessed region; and
the second fixture comprises a first surface having a third recessed region and a second surface having a fourth recessed region, the porous second region and a second stop arrangement respectively situated within the third recessed region.

38. The fixture apparatus of claim 37, wherein the second recessed region of the first fixture is adapted to receive a first half of a press, and the fourth recessed region of the second fixture is adapted to receive a second half of a press.

* * * * *

UNITED STATES PATENT AND TRADEMARK OFFICE
CERTIFICATE OF CORRECTION

PATENT NO. : 6,733,912 B2
DATED : May 11, 2004
INVENTOR(S) : Mlinar, John R.

It is certified that error appears in the above-identified patent and that said Letters Patent is hereby corrected as shown below:

<u>Column 7,</u>
Line 2, "region" should read -- region 27 --.

<u>Column 8,</u>
Line 46, "under" should read -- under Attorney Docket No. 57420US002 --.

Signed and Sealed this

Thirtieth Day of August, 2005

JON W. DUDAS
*Director of the United States Patent and Trademark Office*